JACOB SHOUDLER.
Improvement in Wagon Gearings.
No. 115,366.            Patented May 30, 1871.
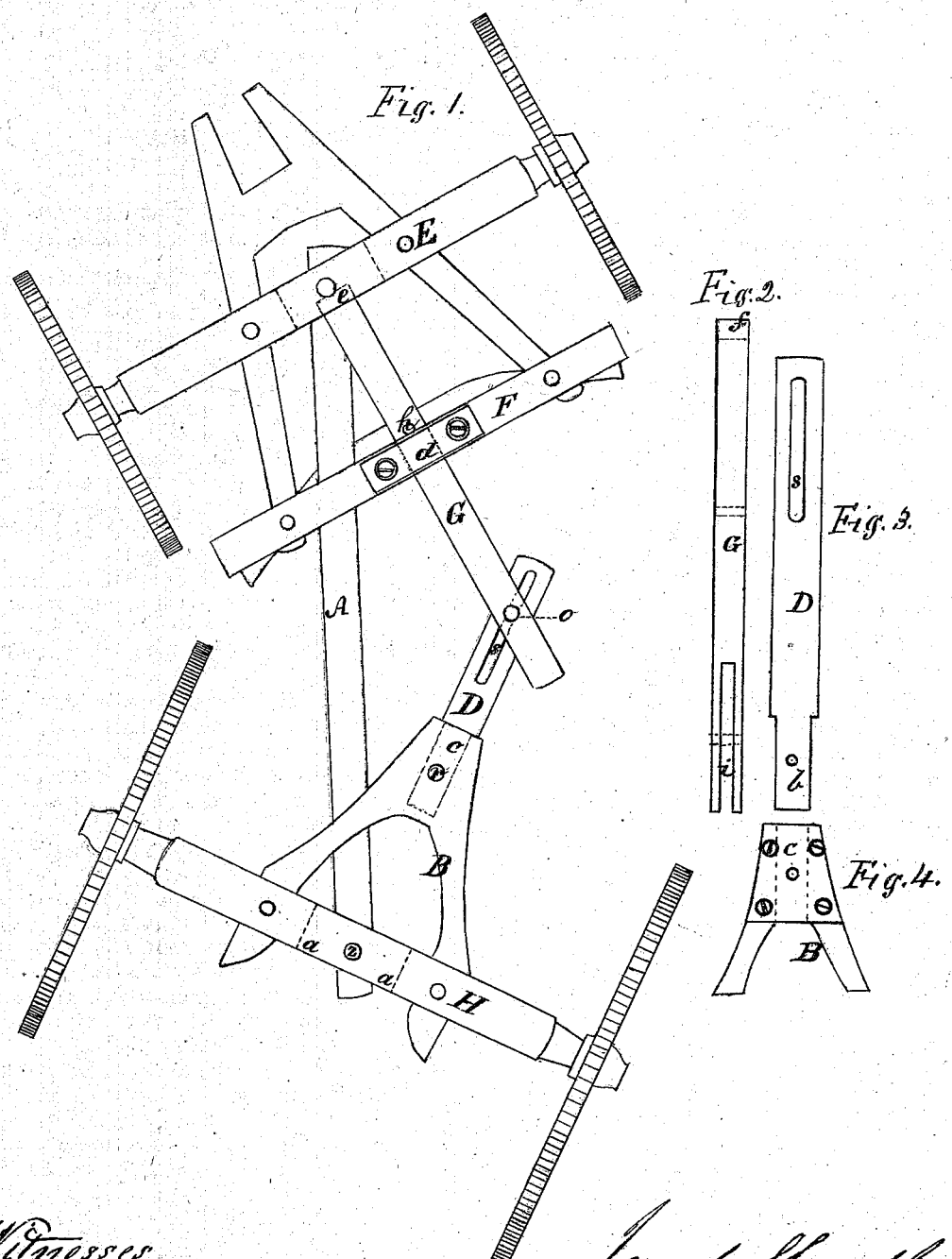

115,366

UNITED STATES PATENT OFFICE.

JACOB SHOUDLER, OF SCOTTSVILLE, NEW YORK.

IMPROVEMENT IN WAGON-GEARINGS.

Specification forming part of Letters Patent No. 115,366, dated May 30, 1871.

*To all whom it may concern:*

Be it known that I, JACOB SHOUDLER, of Scottsville, in the county of Monroe, in the State of New York, have invented a new and useful Improvement in Wagons; and I do hereby declare that the following is a full and exact description thereof, reference being had to the accompanying drawing and to the letters of reference marked thereon.

Figure 1 represents a top view of a farm-wagon with my improvement attached thereto; Fig. 2 represents an edge view of the bifurcated lever; Fig. 3 represents a top view of the slotted lever; and Fig. 4 represents the under side of a portion of the rear hounds.

My invention relates to the adaptation and arrangement of the two removable levers and an auxiliary cross-piece for the front hounds, by which the common farm-wagon may be converted for use, as hereinafter described.

In order to apply my improvement to the common wagon in use the horizontal mortise in the rear axle for the reach A is elongated, as denoted in dotted lines at $a\ a$, and the rear end of the reach is secured therein by a pivot-bolt, $z$, which passes down through the axle. The front ends of the rear hounds B are provided with a mortise, $c$, indicated by dotted lines, to receive the end $b$ of the slotted lever D. The sand-board E and the extra cross-piece F, upon the front hounds and over the reach A, have suitable mortises in them, also denoted in dotted lines at $d\ e$, to receive the end $f$ of lever G. Pivoted bolsters may be used upon both axles, which are furnished with sand-boards E H. The lever G is secured in the two mortises $d\ e$ by the pin $h$, so that its open slot $i$ occupies a horizontal position to receive the slotted end of the lever D, which is also secured by a pin, $r$, within its mortise, denoted by the dotted lines at $c$. One or more holes are provided in the slotted end of lever G for a pin, $o$, which will pass through the slot $s$ of the lever D to couple the ends of the two levers, as represented in the drawing. This coupling allows freedom of lateral movement, limited only by the length of slot $s$. The mortises in both the extra cross-piece F and in the rear hounds are formed with metal plates secured over one side of these mortises, as represented in Figs. 1 and 4.

In using the wagon with my improvement attached the draft of the rear wheels is through the reach A, wholly relieving the levers from any tensional strain, these levers serving to guide the wagon and cause the hinder wheels to follow the track of the forward wheels when advancing in a straight line or in turning around. In backing the wagon substantially the same effect is produced, the forward wheels then following the course of the rear wheels. In turning, the tongue actuates the forward wheels in the usual manner, and the lever G, which is in line with the tongue, will act upon lever D through the pin $o$, working in the slot $s$, and causing the rear wheels to turn in the opposite direction, as indicated in Fig. 1.

It will be observed that when the wagon is drawn forward in a straight course the levers D G so act upon each other that the lateral vibrations of the tongue, caused by passing the forward wheels over obstructions or uneven ground, are counteracted by the rear wheels and the weight supported thereby.

I have found, in using my improvement, that the wagon may be turned around within a much narrower compass than the ordinary wagon, and, as the rear wheels follow nearly in the track of the forward wheels while turning to pass through narrower gateways, there is less liability of the hind wheels coming in contact with the gate-posts.

Wagons constructed with my improvement attached may readily be converted into the ordinary construction by detaching the levers D G and inserting a pin through the front end of the rear hounds and the reach; and the same effect will be secured by removing the pin $o$ from the slotted levers and inserting it through the rear hounds and reach.

I am aware that an auxiliary reach, made of two slotted pieces and permanently connected with a carriage, has been employed to cause both axles to turn upon pivotal connections. I do not claim these devices nor their application to wagons, as my present invention relates to the combination of the two removable levers with an auxiliary cross-piece for the front hounds, by which I am enabled to make the common farm-wagon convertible, to be used in either of the ways described.

Having fully described my improvement in wagons, what I claim as my invention, and desire to secure by Letters Patent, is—

The extra cross-piece F, provided with mortise $d$, in combination with the detachable levers D G and pivotal reach A, arranged as dscribed, for the purpose specified.

In witness whereof I have hereunto set my hand this 4th day of January, 1871.

JACOB SHOUDLER.

Witnesses:
   H. P. K. PECK.
   N. WARREN.